United States Patent
Sumitomo et al.

(10) Patent No.: US 12,470,046 B2
(45) Date of Patent: Nov. 11, 2025

(54) VERTICAL CAVITY SURFACE-EMITTING LASER

(71) Applicant: Sumitomo Electric Industries, Ltd., Osaka (JP)

(72) Inventors: Takamichi Sumitomo, Osaka (JP); Kei Fujii, Osaka (JP); Suguru Arikata, Osaka (JP); Takeshi Aoki, Osaka (JP); Susumu Yoshimoto, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 706 days.

(21) Appl. No.: 17/860,164

(22) Filed: Jul. 8, 2022

(65) Prior Publication Data

US 2023/0036079 A1 Feb. 2, 2023

(30) Foreign Application Priority Data

Jul. 27, 2021 (JP) .................. 2021-122555
Jan. 27, 2022 (JP) .................. 2022-011076

(51) Int. Cl.
*H01S 3/08* (2023.01)
*H01S 5/183* (2006.01)
(Continued)

(52) U.S. Cl.
CPC ...... *H01S 5/34313* (2013.01); *H01S 5/18361* (2013.01); *H01S 5/3013* (2013.01);
(Continued)

(58) Field of Classification Search
CPC ............ H01S 5/34313; H01S 5/18361; H01S 5/3013; H01S 5/3202; H01S 5/3403; H01S 5/18311; H01S 5/18338; H01S 5/1835

See application file for complete search history.

(56) References Cited

U.S. PATENT DOCUMENTS 5,469,458 A  11/1995  Numai
6,483,860 B1  11/2002  Jeki et al.
(Continued)

FOREIGN PATENT DOCUMENTS

JP   06-196814 A   7/1994
JP   2001060739 A   3/2001
(Continued)

OTHER PUBLICATIONS

Hiroyuki Sakaki et al., "One Atomic Layer Heterointerface Fluctuations in GaAs-AlAs Quantum Well Structures and TheirSuppression by Insertion of Smoothing Period in Molecular BeamEpitaxy", Japanese Journalof Applied Physics, vol. 24, No. 6 (Jun. 1985), p. L417-p. L420.

(Continued)

*Primary Examiner* — Kinam Park
(74) *Attorney, Agent, or Firm* — Volpe Koenig

(57) ABSTRACT

A vertical cavity surface-emitting laser configured to emit laser light having a wavelength of 830 nm to 910 nm includes a substrate having a main surface including GaAs, a first distributed Bragg reflector, an active layer, and a second distributed Bragg reflector. The substrate, the first distributed Bragg reflector, the active layer, and the second distributed Bragg reflector are arranged in a first axis direction intersecting the main surface. The main surface has an off angle of 6° or more with respect to a (100) plane. The active layer includes $In_xAl_yGa_{1-x-y}As$ ($0<x<1$, $0 \leq y<1$). The active layer has a strain. An absolute value of the strain is 0.5% to 1.4%.

9 Claims, 11 Drawing Sheets

(51) Int. Cl.
*H01S 5/30* (2006.01)
*H01S 5/32* (2006.01)
*H01S 5/34* (2006.01)
*H01S 5/343* (2006.01)

(52) U.S. Cl.
CPC .......... *H01S 5/3202* (2013.01); *H01S 5/3403* (2013.01); *H01S 5/18311* (2013.01); *H01S 5/18338* (2013.01); *H01S 5/1835* (2013.01)

(56) References Cited

U.S. PATENT DOCUMENTS

| | | | |
|---|---|---|---|
| 2003/0080384 A1* | 5/2003 | Takahashi | H01L 21/02378 257/E21.054 |
| 2005/0121678 A1* | 6/2005 | Ezaki | H01S 5/18355 438/22 |
| 2009/0303308 A1 | 12/2009 | Itoh et al. | |
| 2013/0195135 A1 | 8/2013 | Uchida et al. | |
| 2020/0076161 A1 | 3/2020 | Fujii et al. | |
| 2022/0385040 A1* | 12/2022 | Kubota | H01S 5/3202 |

FOREIGN PATENT DOCUMENTS

| | | |
|---|---|---|
| JP | 2001-168461 A | 6/2001 |
| JP | 2009-295792 A | 12/2009 |
| JP | 2013-157473 A | 8/2013 |
| JP | 2015079903 A | 4/2015 |
| JP | 2020035964 A | 3/2020 |

OTHER PUBLICATIONS

Satoshi Shimomura et al., "Extremely Flat Interfaces in GaAs/AlGaAs Quantum Wells Grown on GaAs (411)A Substratesby Molecular Beam Epitaxy", Japanese Journal of Applied Physics, vol. 32 Part 2 No. 12A Dec. 1993, p. L1728-p. L1731.

* cited by examiner

VERTICAL CAVITY SURFACE-EMITTING LASER

CROSS REFERENCE TO RELATED APPLICATIONS

This application claims priority based on Japanese Patent Application No. 2022-011076 filed on Jan. 27, 2022 and Japanese Patent Application No. 2021-122555 filed on Jul. 27, 2021 and the entire contents of the Japanese patent application are incorporated herein by reference.

TECHNICAL FIELD

The present disclosure relates to vertical cavity surface-emitting lasers.

BACKGROUND

Patent Document 1 (Japanese Laid-open Patent Publication No. 2013-157473) and Patent Document 2 (Japanese Laid-open Patent Publication No. 2009-295792) disclose vertical cavity surface-emitting lasers having a lower reflective mirror, an active layer, and an upper reflective mirror on an off substrate. In the Patent Document 1, the active layer has a multiple quantum well structure of GaInP/AlGaInP. In the Patent Document 2 the active layer has a triple quantum well structure made of GaInAsP/$Al_{0.33}Ga_{0.67}As$, a triple quantum well structure made of GaInAsP/$Al_{0.33}Ga_{0.67}As$, or a triple quantum well structure made of GaAs/AlGaAs.

SUMMARY

A vertical cavity surface-emitting laser according to one aspect of the present disclosure configured to emit laser light having a wavelength of 830 nm to 910 nm includes a substrate having a main surface including GaAs, a first distributed Bragg reflector, an active layer, and a second distributed Bragg reflector. The substrate, the first distributed Bragg reflector, the active layer, and the second distributed Bragg reflector are arranged in a first axis direction intersecting the main surface. The main surface has an off angle of 6° or more with respect to a (100) plane. The active layer includes $In_xAl_yGa_{1-x-y}As$ ($0<x<1$, $0≤y<1$). The active layer has a strain. An absolute value of the strain is 0.5% to 1.4%.

DETAILED DESCRIPTION

Figure 1:
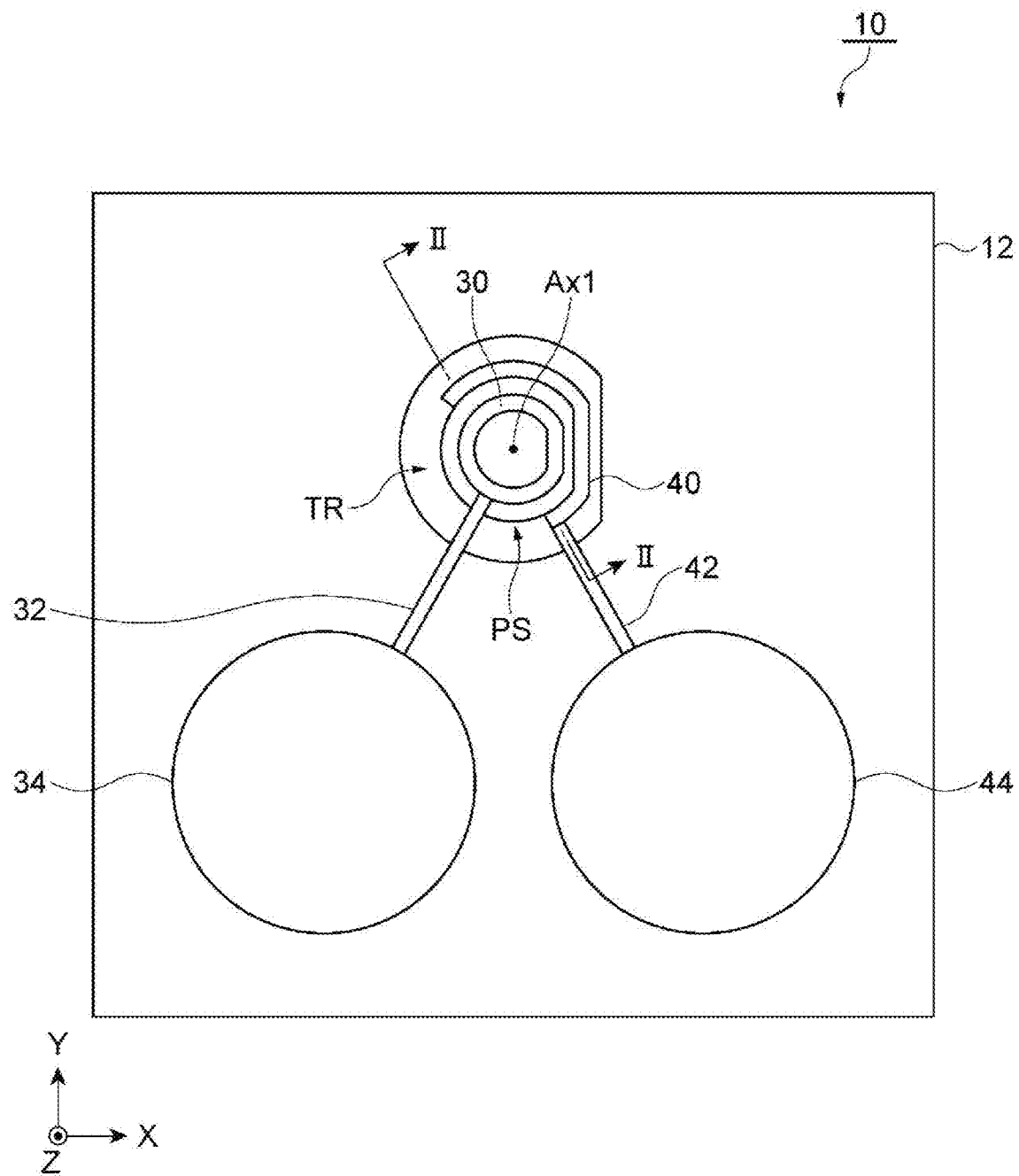
FIG. 1 is a plan view schematically illustrating a vertical cavity surface-emitting laser according to one embodiment.

When an active layer containing $In_xAl_yGa_{1-x-y}As$ ($0<x<1$, $0≤y<1$) is formed on a GaAs substrate, an absolute value of the strain of the active layer is increased by increasing an In composition x.

The present inventors have found that in a substrate having an off angle of less than 6°, the photoluminescence intensity of the active layer decreases as the absolute value of the strain of the active layer increases.

The present disclosure provides a vertical cavity surface-emitting laser comprising an active layer having a high photoluminescence intensity.

DESCRIPTION OF EMBODIMENTS OF PRESENT DISCLOSURE

A vertical cavity surface-emitting laser according to one embodiment configured to emit laser light having a wavelength of 830 nm to 910 nm includes a substrate having a main surface including GaAs, a first distributed Bragg reflector, an active layer, and a second distributed Bragg reflector. The substrate, the first distributed Bragg reflector, the active layer, and the second distributed Bragg reflector are arranged in a first axis direction intersecting the main surface. The main surface has an off angle of 6° or more with respect to a (100) plane. The active layer includes $In_xAl_yGa_{1-x-y}As$ ($0<x<1$, $0≤y<1$). The active layer has a strain. An absolute value of the strain is 0.5% to 1.4%.

According to the vertical cavity surface-emitting laser, even if the absolute value of the strain of the active layer is large, the active layer has high photoluminescence intensity because the off angle is large.

The off angle may be 10° or more. In this case, a surface roughness of the interface in the active layer becomes small.

The vertical cavity surface-emitting laser may further include a current confinement layer disposed between the active layer and the second distributed Bragg reflector. The current confinement layer may include an aperture portion and an oxidized portion surrounding the aperture portion. The current confinement layer may have a uniaxially symmetric shape or an asymmetric shape at a cross section orthogonal to the first axis direction. In this case, the aperture portion may have an asymmetric shape in the cross section.

The active layer may have a carbon concentration of $3×10^{16}$ $cm^{-3}$ or less. In an active layer provided on a substrate having a large off angle, defects of As-loss are unlikely to occur. In this case, it is no longer necessary to increase the carbon concentration in the active layer in order to fill the defects due to As-loss. Excellent laser characteristics while using an active layer of low carbon concentration can be obtained.

The absolute value of the strain may be 1.1% to 1.3%. In this case, a larger relaxation oscillation frequency can be obtained.

The off angle may be 26° or less. In this case, the crystallinity can be improved.

Details of Embodiments of Present Disclosure

Embodiments of the present disclosure will now be described in detail with reference to the accompanying drawings. In the description of the drawings, the same reference numerals are used for the same or equivalent elements, and redundant description is omitted. In the figure, XYZ coordinate axes are shown as necessary. The X-axis direction, the Y-axis direction, and the Z-axis direction intersect (for example, orthogonal to) each other.

Figure 2:
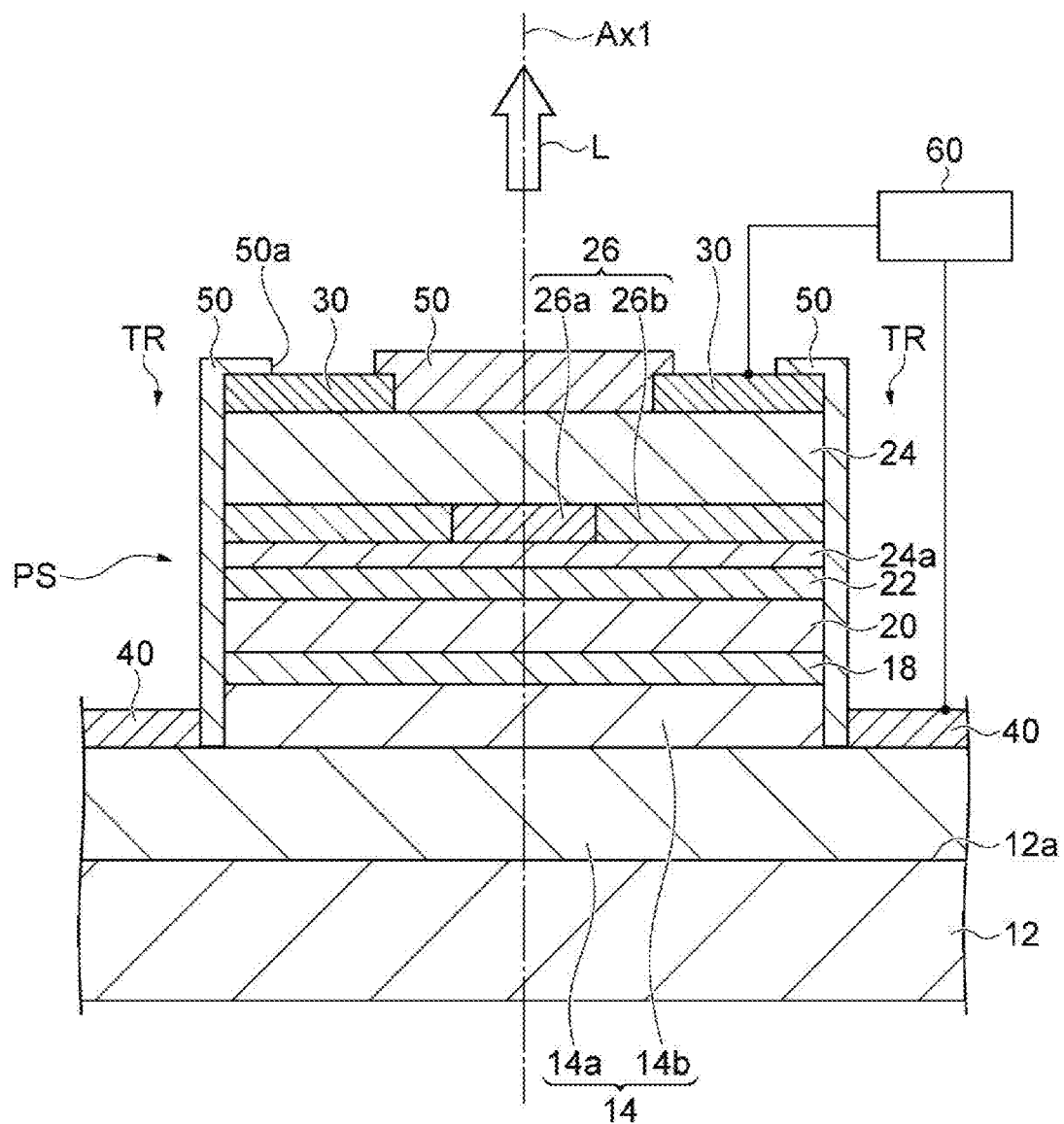
FIG. 2 is a cross-sectional view taken along line II-II of FIG. 1.

FIG. 1 is a plan view schematically illustrating a vertical cavity surface-emitting laser according to one embodiment. FIG. 2 is a cross-sectional view taken along line II-II of FIG. 1. A vertical cavity surface-emitting laser (VCSEL) 10 shown in FIGS. 1 and 2 is capable of emitting a laser light L. Laser light L has a wavelength of 830 nm to 910 nm. Vertical cavity surface-emitting laser 10 includes a substrate 12 having a main surface 12a including GaAs, a first distributed Bragg reflector 14, an active layer 20, and a second distributed Bragg reflector 24. Substrate 12, first distributed Bragg reflector 14, active layer 20, and second distributed Bragg reflector 24 are arranged along the direction (for example, the Z-axis direction) of a first axis Ax1 intersecting (for example, orthogonal to) main surface 12a.

Substrate 12 may be a GaAs substrate. Substrate 12 may include a base substrate and a GaAs layer provided on the base substrate. In this case, a top surface of the GaAs layer is main surface 12a.

Main surface 12a of substrate 12 has an off angle of 6° or more with respect to the (100) plane. The off angle may be 10° or more, or may be 15° or more. The off angle may be 26° or less, 25.2° or less, or 25° or less. The normal vector (positive direction in the Z-axis direction) of main surface 12a may be, for example, a direction inclined by an off angle from a <100> direction to a <111> direction. The <100> direction is the normal vector of the (100) plane. The direction in which the <111> direction is projected onto the XY plane may be the negative direction of the Y-axis direction.

First distributed Bragg reflector 14 has a semiconductor laminated structure. The semiconductor laminated structure may have a first conductivity type (e.g., n-type). The semiconductor laminated structure includes a first semiconductor layer and a second semiconductor layer alternately arranged in the Z-axis direction. The first semiconductor layer and the second semiconductor layer have different refractive indices from each other. The first semiconductor layer may be a GaAs layer. The second semiconductor layer may be an AlGaAs layer. First distributed Bragg reflector 14 may include a first lower distributed Bragg reflector 14a and a second lower distributed Bragg reflector 14b. First lower distributed Bragg reflector 14a is disposed between substrate 12 and second lower distributed Bragg reflector 14b. First lower distributed Bragg reflector 14a may have, for example, an i-type semiconductor laminated structure. In this case, second lower distributed Bragg reflector 14b has a semiconductor laminated structure of the first conductivity type (e.g., n-type). A semiconductor layer of the first conductivity type (e.g., n-type) may be provided between first lower distributed Bragg reflector 14a and second lower distributed Bragg reflector 14b.

Second distributed Bragg reflector 24 has a semiconductor laminated structure of a second conductivity type (e.g., p-type). The semiconductor laminated structure includes a third semiconductor layer and a fourth semiconductor layer alternately arranged in the Z-axis direction. The third semiconductor layer and the fourth semiconductor layer have different refractive indices from each other. The third semiconductor layer may be a GaAs layer. The fourth semiconductor layer may be an AlGaAs layer. The dopant for imparting p-type conductivity is, for example, carbon. The carbon concentration doped into the layer of second distributed Bragg reflector 24 may be in the range of $1 \times 10^{18}$ cm$^{-3}$ to $1 \times 10^{19}$ cm$^{-3}$.

Vertical cavity surface-emitting laser 10 may further include a current confinement layer 26 disposed between active layer 20 and second distributed Bragg reflector 24. Current confinement layer 26 includes an aperture portion 26a and an oxidized portion 26b surrounding aperture portion 26a. First axis Ax1 passes through aperture portion 26a. Aperture portion 26a may include a group III-V compound semiconductor including aluminum as a group III element. Aperture portion 26a includes, for example, AlGaAs. Aperture portion 26a has the second conductivity type (p-type) and contains, for example, carbon as a p-type dopant. The carbon concentration in aperture portion 26a is, for example, $5 \times 10^{18}$ cm$^{-3}$. Oxidized portion 26b includes, for example, aluminum oxides. In this case, oxidized portion 26b can be formed by oxidizing the group III-V compound semiconductor containing aluminum using, for example, water or the like. A semiconductor layer 24a of the second conductivity type (e.g., p-type) may be disposed between current confinement layer 26 and active layer 20. Semiconductor layer 24a may be a GaAs layer. The carbon concentration of semiconductor layer 24a is, for example, $1 \times 10^{18}$ cm$^{-3}$.

A spacer layer 18 may be disposed between active layer 20 and first distributed Bragg reflector 14. Spacer layer 18 may include GaAs or AlGaAs. A spacer layer 22 may be disposed between active layer 20 and current confinement layer 26. Spacer layer 22 may be disposed between active layer 20 and semiconductor layer 24a. Spacer layer 22 may include GaAs or AlGaAs. Spacer layer 22 may have the second conductivity type (p-type) or may not have conductivity. When spacer layer 22 has p-type conductivity, the carbon concentration in spacer layer 22 is, for example, $1 \times 10^{18}$ cm$^{-3}$.

Vertical cavity surface-emitting laser 10 may have a post PS provided on main surface 12a of substrate 12. First axis Ax1 passes through post PS. Post PS includes second lower distributed Bragg reflector 14b, spacer layer 18, active layer 20, spacer layer 22, semiconductor layer 24a, current confinement layer 26, and second distributed Bragg reflector 24. For example, a trench TR is provided around post PS. The bottom of trench TR reaches first lower distributed Bragg reflector 14a.

An insulating layer 50 may be provided on top and side surfaces of post PS. Insulating layer 50 has an opening 50a on the top surface of post PS. A first electrode 30 electrically connected to second distributed Bragg reflector 24 may be provided in opening 50a. First electrode 30 has a ring shape surrounding first axis Ax1. First electrode 30 is connected to a pad electrode 34 by a wiring conductor 32. A second electrode 40 electrically connected to first distributed Bragg reflector 14 may be provided at the bottom of trench TR. Second electrode 40 is connected to a pad electrode 44 by a wiring conductor 42. A bias power supply 60 may be electrically connected to first electrode 30 and second electrode 40. Specifically, bias power supply 60 is connected to pad electrode 34 and pad electrode 44 by wirings. Bias power supply 60 may apply a voltage between first electrode 30 and second electrode 40. When the voltage is applied between first electrode 30 and second electrode 40, a bias current is supplied to active layer 20 through current confinement layer 26. Thus, laser light L is emitted in the Z-axis direction.

Figure 3:
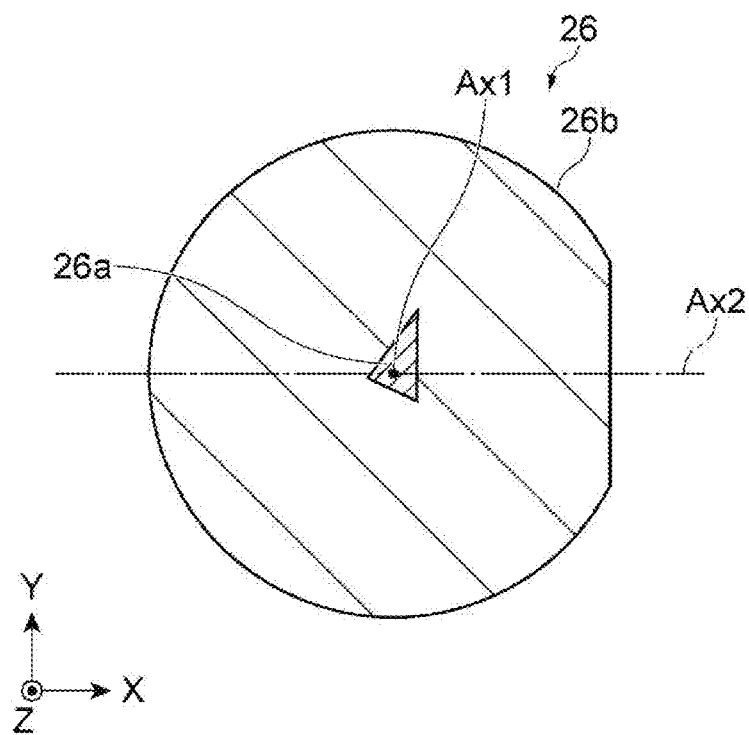
FIG. 3 is a cross-sectional view of a current confinement layer of a vertical cavity surface-emitting laser according to one embodiment.

FIG. 3 is a cross-sectional view of a current confinement layer of a vertical cavity surface-emitting laser according to one embodiment. As shown in FIG. 3, in the embodiment of the present disclosure, current confinement layer 26 has a uniaxially symmetric shape in a cross section (XY cross section). The XY cross section is orthogonal to the Z-axis direction. A uniaxially symmetric shape is a shape that is symmetric about a single axis. Current confinement layer 26 has a symmetrical shape with respect to only a second axis Ax2. Second axis Ax2 is orthogonal to first axis Ax1. Second axis Ax2 extends along the X-axis direction. Current confinement layer 26 has an asymmetric shape with respect to all axes other than second axis Ax2 in the XY cross section. On second axis Ax2, a length from first axis Ax1 to one edge is longer than a length from first axis Ax1 to the other edge. Current confinement layer 26 has a shape including, for example, a circular arc portion centered on first axis Ax1 and a linear portion extending in the Y-axis direction in the XY cross section. The central angle of the circular arc portion is, for example, greater than 180°. The length of the straight portion is, for example, shorter than the diameter of the circular arc portion and larger than the radius of the circular arc portion. Post PS also has the same shape as current confinement layer 26 in the XY cross section.

Aperture portion 26a has an asymmetric shape in the XY cross section. Aperture portion 26a has the asymmetric shape with respect to all axes in the XY cross section. A maximum length of aperture portion 26a in the Y-axis direction is greater than a maximum length of aperture portion 26a in the X-axis direction. Aperture portion 26a has, for example, a triangular shape having three sides of different lengths. The longest side extends along the Y-axis direction. Each vertex of the triangle may be rounded. Since main surface 12a of substrate 12 has an off angle, the progress speed of the oxidizing process from the edge of current confinement layer 26 toward first axis Ax1 in the XY cross section varies depending on the progress direction. Thus, aperture portion 26a has the asymmetric shape in the XY cross section. For example, the progress speed of the oxidation process in the positive direction of the Y-axis direction is higher than the progress speed of the oxidation process in the negative direction of the Y-axis direction.

A shape of aperture portion 26a and an area of aperture portion 26a can be adjusted by, for example, the area of current confinement layer 26 in the XY cross section, the oxidization time to form oxidized portion 26b, the off angle of main surface 12a of substrate 12, and the like. When the area of current confinement layer 26 in the XY cross section is small, the shape of aperture portion 26a approaches a triangular shape as shown in FIG. 3. When the area of current confinement layer 26 in the XY cross section is large, the shape of aperture portion 26a approaches a pentagonal shape. When the area of current confinement layer 26 in the XY cross section is much larger, the shape of aperture portion 26a approaches a hexagonal shape. The shape of aperture portion 26a may be another polygonal shape or a shape including a curved line. The area of aperture portion 26a becomes smaller, for example, by reducing the oxidization time to form oxidized portion 26b. The area of aperture portion 26a in the XY cross section is, for example, 7 µm² to 100 µm², or 12 µm² to 100 µm².

Current confinement layer 26 may have an asymmetric shape in the XY cross section. In this case, current confinement layer 26 has the asymmetric shape with respect to all axes in the XY cross section. Current confinement layer 26 may have a biaxially symmetric shape in the XY cross section. In this case, current confinement layer 26 has, for example, a circular shape or a rectangular shape in the XY cross section.

Figure 4:
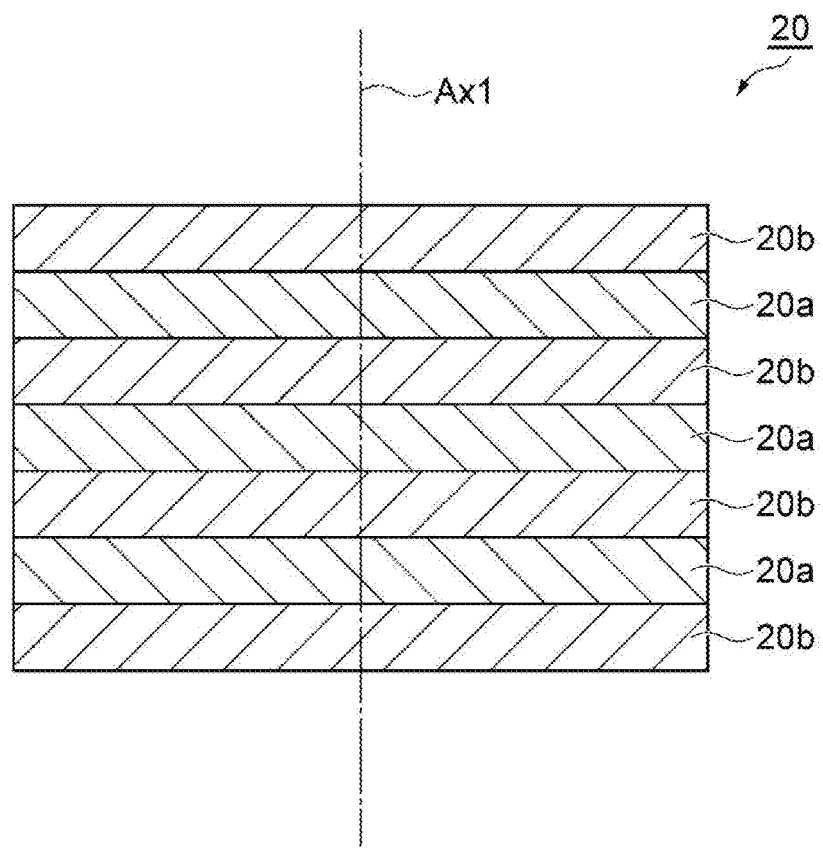
FIG. 4 is a cross-sectional view of an active layer of a vertical cavity surface-emitting laser according to one embodiment.

FIG. 4 is a cross-sectional view of an active layer of a vertical cavity surface-emitting laser according to one embodiment. Active layer 20 may have a quantum well structure including a well layer 20a and a barrier layer 20b. Well layer 20a and barrier layer 20b are alternately arranged along the direction of first axis Ax1. Active layer 20 may have a multiple quantum well structure including a plurality of well layers 20a.

Active layer 20 includes $In_xAl_yGa_{1-x-y}As$ ($0<x<1$, $0 \leq y<1$). Active layer 20 may be nitrogen-free. In the embodiment of the present disclosure, well layer 20a includes $In_xAl_yGa_{1-x-y}As$ ($0<x<1$, $0 \leq y<1$). The wavelength of laser light L can be adjusted by changing the Al composition y. Barrier layer 20b may comprise GaAs or AlGaAs.

Active layer 20 may have a carbon concentration greater than 0 $cm^{-3}$ and equal to or less than $3 \times 10^{16}$ $cm^{-3}$. The carbon concentration can be measured by a secondary ion mass spectrometry (SIMS) method. The carbon concentration may be an average value over the thickness of active layer 20.

Active layer 20 has a strain. In the embodiment of the present disclosure, well layer 20a has strain. The absolute value of the strain is 0.5% to 1.4%. The absolute value of the strain may be 1.1% to 1.3%. The absolute value of the strain may be 1.0% or more. The absolute value of the strain increases as In composition x in well layer 20a increases. When a lattice constant of the material of main surface 12a of substrate 12 is denoted by $a_0$ and a lattice constant of the material of well layer 20a is denoted by $a_w$, the strain $\varepsilon_w$ of well layer 20a with respect to main surface 12a of substrate 12 is calculated by the following equation (1). Since $a_w$ is larger than $a_0$, strain $\varepsilon_w$ is a compressive strain in the XY plane.

$$\varepsilon_w = \frac{a_0 - a_w}{a_w} \times 100 (\%) \tag{1}$$

For example, lattice constant $a_0$ of GaAs is 5.65 angstroms. Lattice constant $a_w$ of $In_xGa_{1-x}As$ (x=0.07) is 5.68 angstroms. In this case, strain $\varepsilon_w$ is −0.5%. Lattice constant $a_w$ of $In_xGa_{1-x}As$ (x=0.14) is 5.71 angstroms. In this case, strain $\varepsilon_w$ is −1.0%. Lattice constant $a_w$ of $In_xGa_{1-x}As$ (x=0.154) is 5.72 angstroms. In this case, strain $\varepsilon_w$ is −1.1%.

Figure 5:
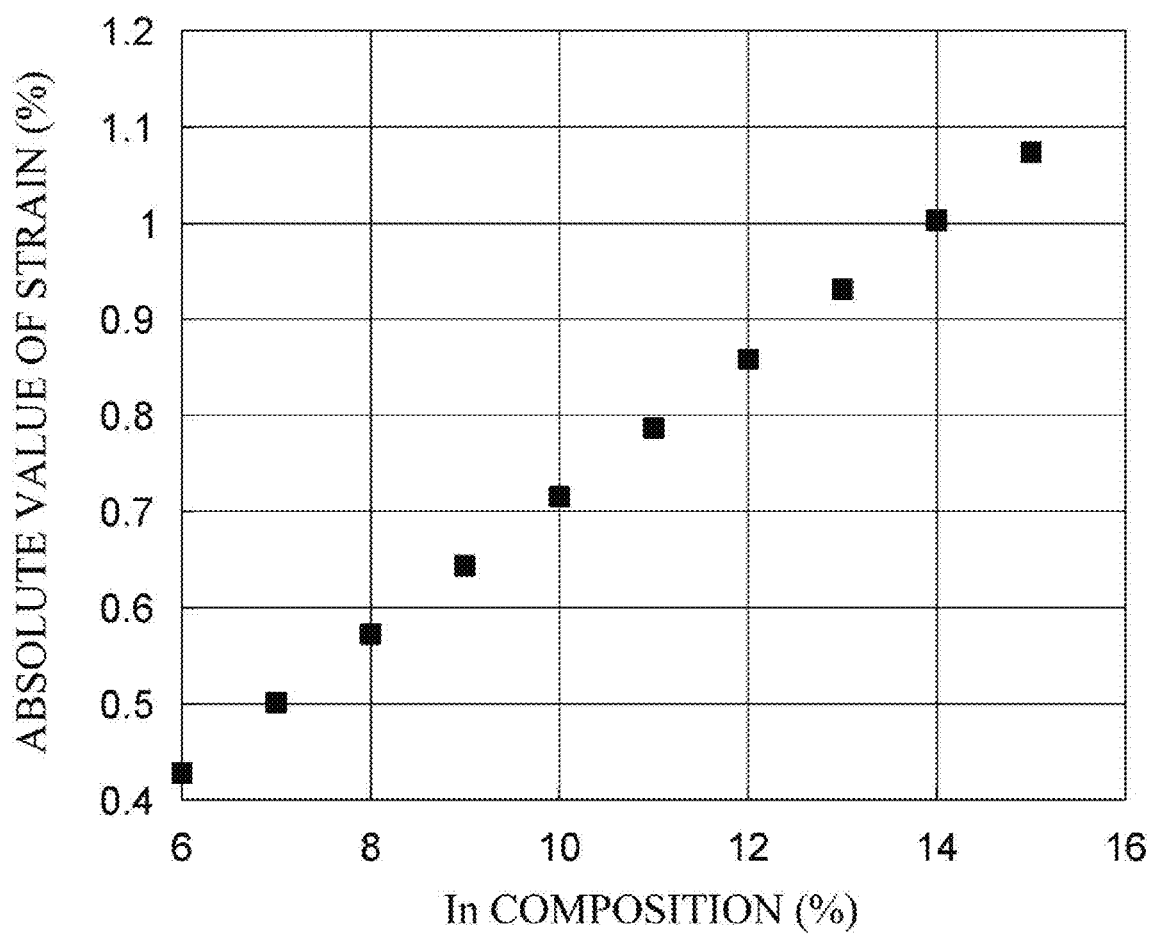
FIG. 5 is a graph illustrating an example of the relationship between an In composition and an absolute value of strain.

FIG. 5 is a graph illustrating an example of the relationship between the In composition and the absolute value of strain. As shown in FIG. 5, the absolute value of the strain of the $In_xGa_{1-x}As$ layer ($0<x<1$) formed on the GaAs substrate linearly increases as In composition x increases. When In composition x is 0.07 to 0.14, the absolute value of the strain is 0.5% to 1.0%. When In composition x is 0.07 to 0.196, the absolute value of the strain is 0.5% to 1.4%. When In composition x is 0.154 to 0.182, the absolute value of the strain is 1.1% to 1.3%.

In general, when the absolute value of the strain of the active layer increases, defects for relaxing the strain are formed in the active layer. Due to defects, the photoluminescence intensity of the active layer decreases. In contrast, according to vertical cavity surface-emitting laser 10 described above, even if the absolute value of the strain of active layer 20 increases, active layer 20 has high photoluminescence (PL) intensity. The PL intensity of active layer 20 increases as the off angle of main surface 12a of substrate 12 increases. The reason for this is considered as follows. As the off angle increases, the As site density in main surface 12a of substrate 12 decreases. For example, when the off angle is increased from 2° to 15°, the As site density is theoretically decreased to about ⅓. Theoretically, when the off angle is 25.2° (i.e., main surface 12a is the (311) plane), the As site density is minimized. Since As causes defects due to As-loss, defects in the semiconductor layer formed on main surface 12a of substrate 12 decrease as the As site density decreases. As a result, defects in active layer 20 are also reduced. As the off angle increases, the density of trap levels in the semiconductor layer formed on main surface 12a of substrate 12 decreases. As a result, the trap level density of active layer 20 is also reduced. For example, when the off angle is increased from 2° to 15°, the trap level density of the AlGaAs layer formed on the GaAs substrate decreases to about 1/10. The trap level density can be measured by a DLTS (Deep Level Transient Spectroscopy) method.

Figure 6:
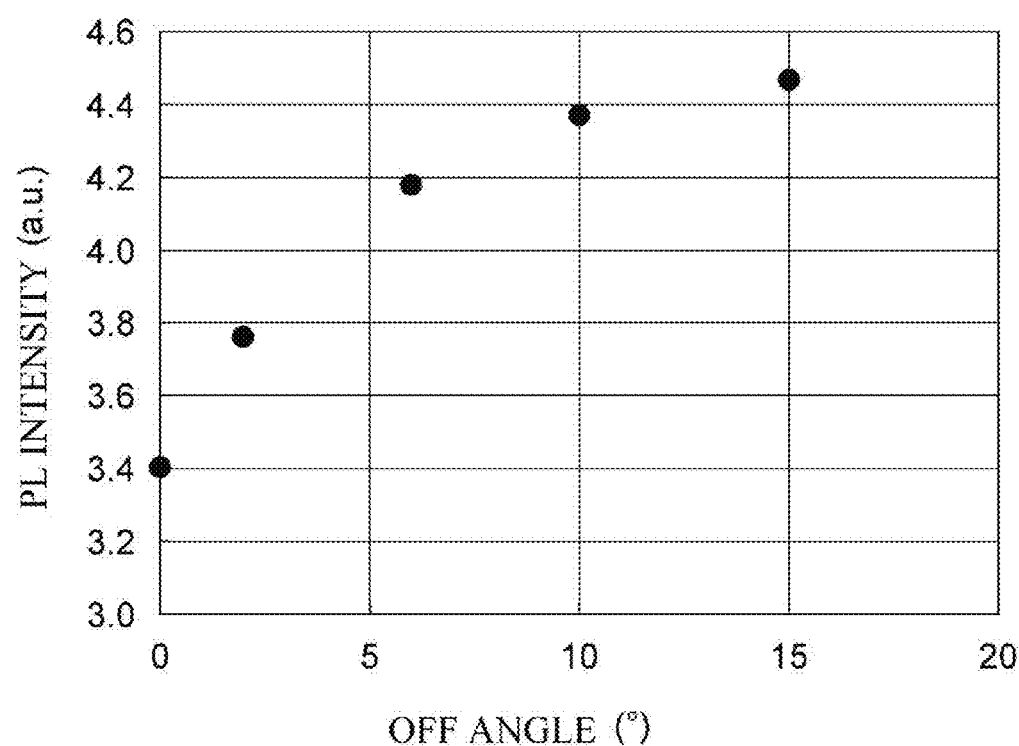
FIG. 6 is a graph illustrating an example of the relationship between an off angle and a PL intensity.

FIG. 6 is a graph illustrating an example of the relationship between the off angle and the PL intensity. As shown in FIG. 6, when the off angle of the main surface of GaAs substrate is 6° or more, the PL intensity of the $In_xGa_{1-x}As$ layer (0<x<1) is significantly increased to 4.0 or more. The GaAs substrate is an example of substrate 12. The $In_xGa_{1-x}As$ layer (0<x<1) layer is an example of Well layer 20a. In this example, the absolute value of the strain of the $In_xGa_{1-x}As$ layer (0<x<1) layer formed on the GaAs substrate is 0.7%. The PL intensity is measured for emissions having a wavelength from 830 nm to 840 nm.

When the group III-V compound semiconductor contain carbon, carbon atoms are coordinated to defects due to As-loss, and the density of defects decreases. Carbon doped at a high concentration in a group III-V compound semiconductor is effective in filling defects of As-loss. On the other hand, in the active layer, when the carbon concentration is high, the laser characteristics of the surface emitting laser, such as the threshold value or the slope efficiency, deteriorate due to light absorption by carbon. In active layer 20 provided on substrate 12 having a large off angle, defects of As-loss are unlikely to occur. Therefore, it is not necessary to fill defects of As-loss with carbon, and active layer 20 may have a carbon concentration of $3\times10^{16}$ $cm^{-3}$ or less. Therefore, vertical cavity surface-emitting laser 10 including substrate 12 having the high off angle has good laser characteristics while maintaining the high PL intensity of active layer 20.

Further, when the off angle of main surface 12a of substrate 12 is 6° or more, the surface roughness of the interface between well layer 20a and barrier layer 20b is smaller than that when the off angle is 2°. The surface roughness may be evaluated by a root mean square (RMS) value. The RSM value of the surface roughness can be measured by an atomic force microscope (AFM). When the surface roughness of the interface between well layer 20a and barrier layer 20b is small, the half-width of the photoluminescence spectrum of well layer 20a can be reduced.

Figure 7:
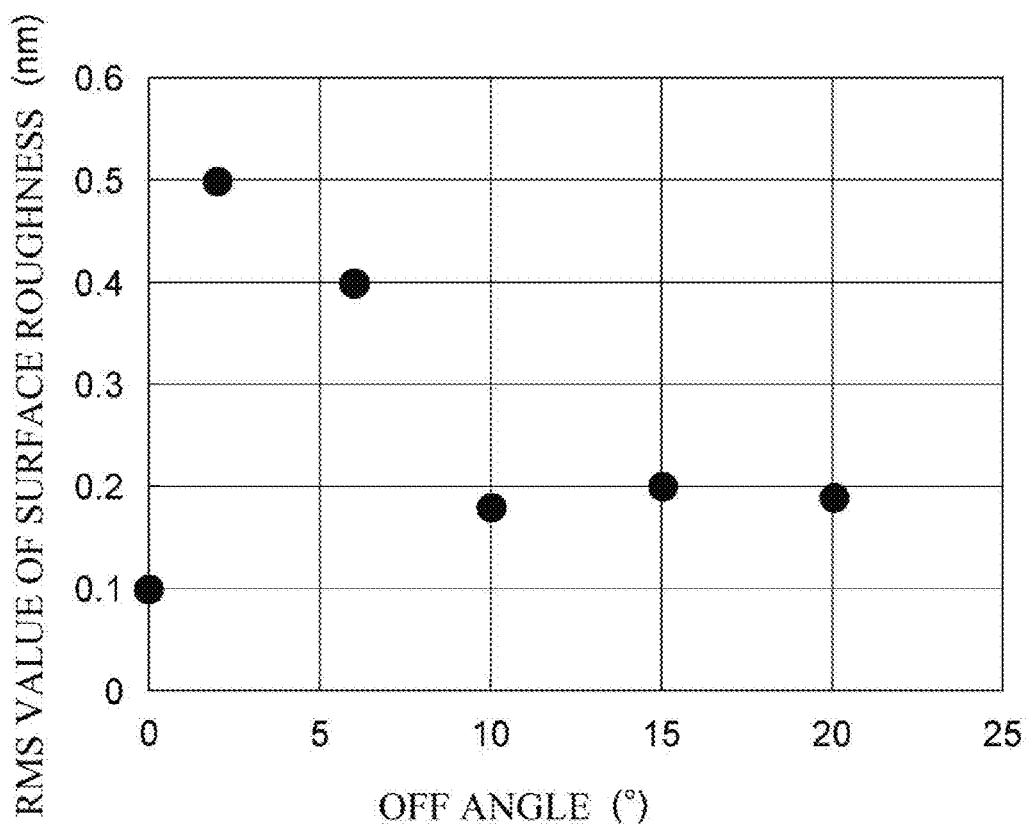
FIG. 7 is a graph illustrating an example of the relationship between the off angle and an RMS value of a surface roughness.

FIG. 7 is a graph illustrating an example of the relationship between the off angle and an RMS value of the surface roughness. As shown in FIG. 7, when the off angle of the main surface of the GaAs substrate is 6° or more, the RMS-value of the surface roughness of the GaAs layer becomes as small as 0.4 nm or less. When the off angle of the main surface of the GaAs substrate is 10° or more, the RMS-value of the surface roughness becomes 0.3 nm or less or 0.2 nm or less, which is remarkably small. The GaAs substrate is an example of substrate 12. The GaAs layer is an example of barrier layer 20b.

When the off angle of the main surface of the GaAs substrate is 6° or more, the step density on the surface of the GaAs layer becomes as large as 30 lines/μm or more. When the off angle of the main surface of the GaAs substrate is 10° or more, the step density on the surface of the GaAs layer becomes as large as 60 lines/μm or more. The step density can be measured by AFM.

Figure 8:
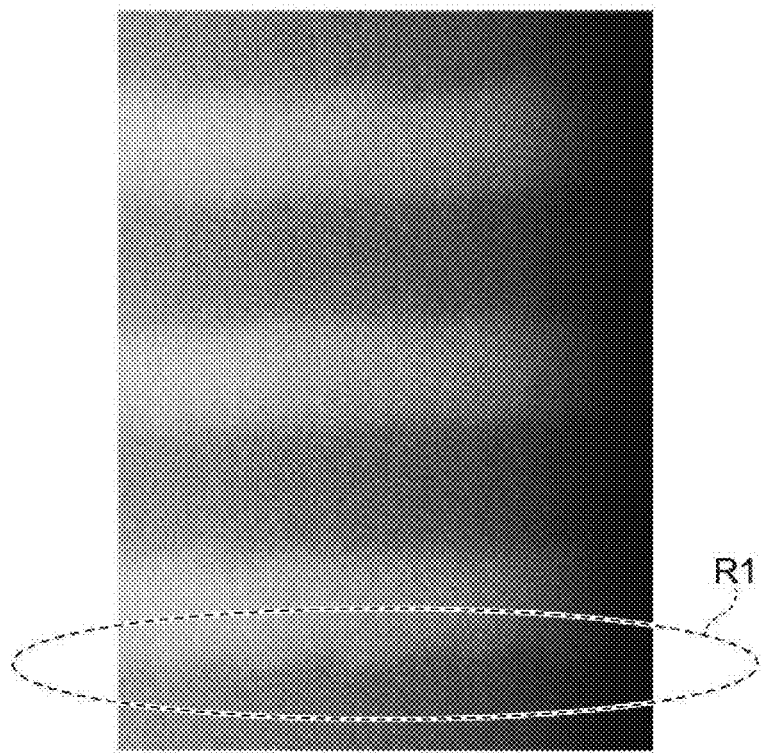
FIG. 8 is a diagram illustrating an example of a transmission electron microscope image of the active layer when the off angle is 2°.
Figure 9:
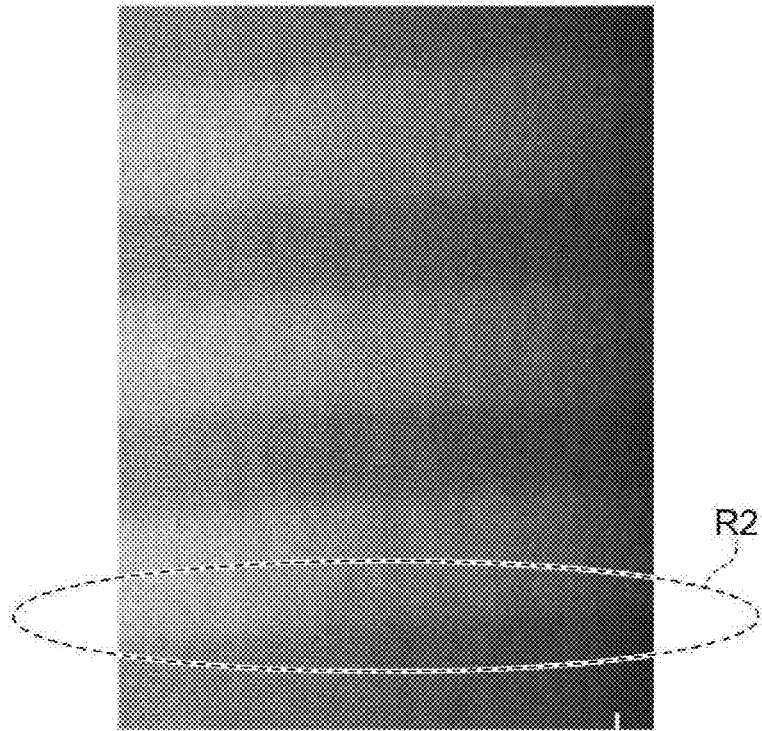
FIG. 9 is a diagram illustrating an example of a transmission electron microscope image of the active layer when the off angle is 15°.

FIG. 8 is a diagram illustrating an example of a transmission electron microscope image of the active layer when the off angle is 2°. FIG. 9 is a diagram illustrating an example of a transmission electron microscope image of the active layer when the off angle is 15°. FIGS. 8 and 9 show examples of cross sections of well layer 20a and barrier layer 20b alternately arranged along first axis Ax1. FIG. 8 shows a region R1 including an interface between an $In_xGa_{1-x}As$ layer (0<x<1) and a GaAs layer. FIG. 9 shows a region R2 including an interface between an $In_xGa_{1-x}As$ layer (0<x<1) and a GaAs layer. As shown in FIGS. 8 and 9, the interface of region R1 is rougher than the interface of region R2. Therefore, when the off angle of the main surface of the GaAs substrate increases, the interface between the $In_xGa_{1-x}As$ layer (0<x<1) and the GaAs layer becomes smooth.

Further, the following experiment was performed. The present disclosure is not limited to the following experiments.

Six vertical cavity surface-emitting lasers having the same structure except that the absolute values of the strain of the active layer were different were prepared. The well layer is an $In_xGa_{1-x}As$ layer (0<x<1) formed on a GaAs substrate. The barrier layer is an $Al_yGa_{1-y}As$ layer (0<y<1). The off angle of the main surface of the GaAs substrate is 15°. The absolute values of the strain are 0.6%, 0.9%, 1.1%, 1.2%, 1.4% and 1.7%, respectively. The relaxation oscillation frequency (fr) was determined by measuring the frequency response of the light output from each vertical cavity surface-emitting laser. The relaxation oscillation frequencies are measured at a temperature of 25° C. and a bias current of 9 mA.

Figure 10:
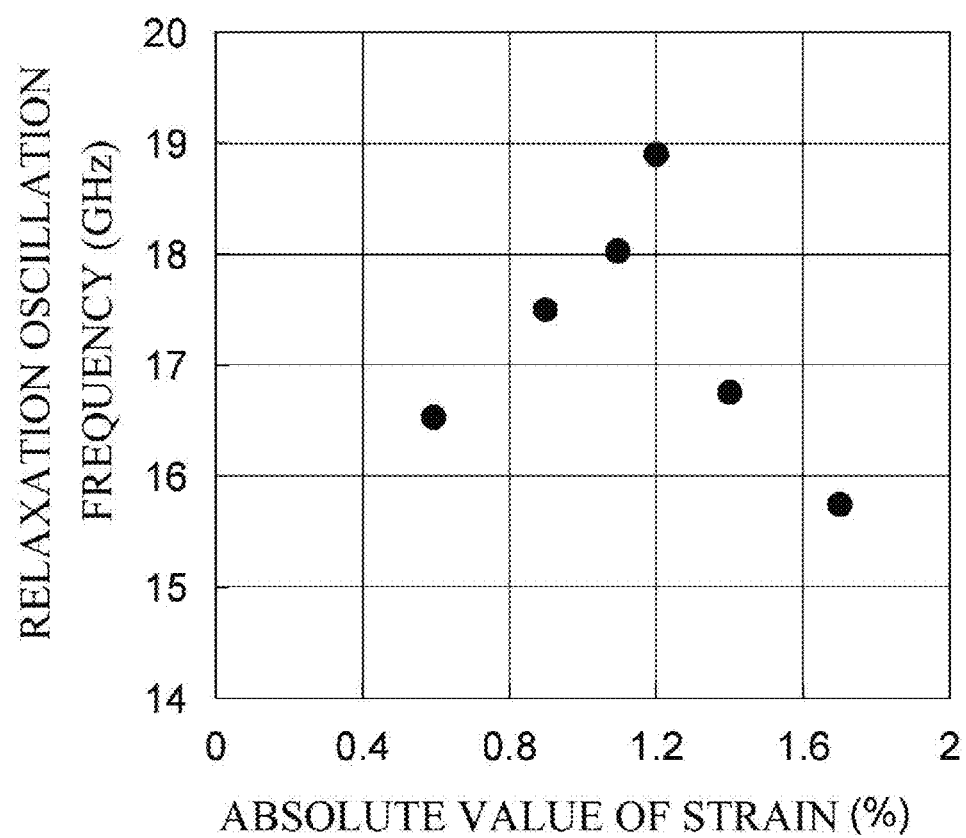
FIG. 10 is a graph illustrating an example of the relationship between the absolute value of strain and a relaxation oscillation frequency.

FIG. 10 is a graph illustrating an example of the relationship between the absolute value of the strain and the relaxation oscillation frequency. As shown in FIG. 10, when the absolute strain value is 0.5% to 1.4%, the relaxation oscillation frequency increases to, for example, 16 GHz or more. When the absolute value of the strain is 1.1% to 1.3%, the relaxation oscillation frequency increases to, for example, 18 GHz or more. When the absolute value of the strain exceeds 1.4%, the relaxation oscillation frequency decreases. It is considered that this is because the quality of the active layer decreases due to an increase in the absolute value of the strain. The decrease in the quality of the active layer causes an increase in the laser threshold value and a decrease in the slope efficiency, so that the relaxation oscillation frequency decreases.

Next, a plurality of multiple quantum well structures having the same structure except that the widths w of the well layer were different were prepared. The well layer is the $In_xGa_{1-x}As$ layer (0<x<1) formed on a GaAs substrate. The widths w of the well layers were changed within a range from 2 nm to 10 nm. The barrier layer is an $Al_yGa_{1-y}As$ layer ($0<y<1$). Photoluminescence measurements were performed on each multiplexed quantum well structure. A full width at half maximum FWHM (w) of the photoluminescence spectrum is a function of a width w of the well layer. A peak wavelength $\lambda$ (w) of the photoluminescence spectrum is a function of width w of the well layer. Using the following equation (2), a film thickness fluctuation $\Delta w$ (nm) and a composition fluctuation $\Delta c$ (nm) can be obtained from full width at half maximum FWHM (w) and peak wavelength $\lambda$ (w).

$$FWHM(w) = \frac{\partial}{\partial w}\lambda(w) \times \Delta w + \Delta c \quad (2)$$

The decrease in film thickness fluctuation $\Delta w$ means a decrease in the surface roughness at the interface between the well layer and the barrier layer. An interface quality evaluation method using such film thickness fluctuation $\Delta w$ is described in, for example, the following non-patent document 1 and non-patent document 2.

Non-patent document 1: Hiroyuki SAKAKI et al., "One Atomic Layer Heterointerface Fluctuations in GaAs—AlAs Quantum Well Structures and Their Suppression by Insertion of Smoothing Period in Molecular Beam Epitaxy", Japanese Journal of Applied Physics, Vol. 24, No. 6, pp. L417-L420, June 1985

Non-patent document 2: Satoshi SHIMOMURA et al., "Extremely Flat Interfaces InGaAs/AlGaAs Quantum Wells Grown on GaAs (411) A Substrate by Molecular Beam Epitaxy", Japanese Journal of Applied Physics, Vol. 32, Part 2, No. 12A, pp. L1728-L1731, 1 Dec. 1993

In addition, five multiple quantum well structures having the same structure except for different off angles were prepared. The off angles of the main surface of the GaAs substrate are 2°, 15°, 19.5°, 25.2° and 35.3°, respectively. For each multiple quantum well structure, film thickness fluctuation $\Delta w$ was calculated by the method described above.

Figure 11:
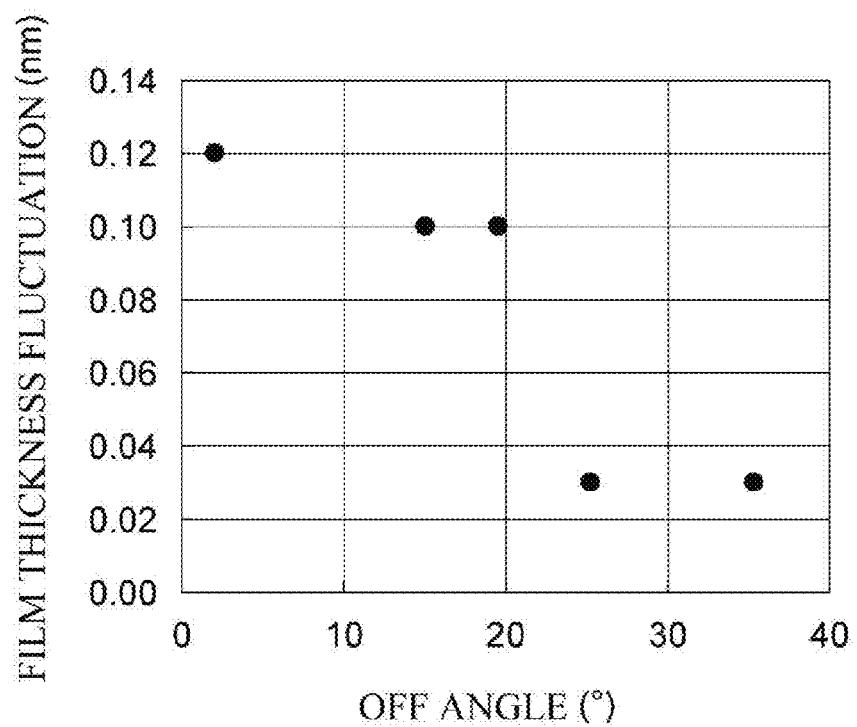
FIG. 11 is a graph illustrating an example of the relationship between the off angle and a film thickness fluctuation.

FIG. 11 is a graph illustrating an example of the relationship between the off angle and film thickness fluctuation. As shown in FIG. 11, film thickness fluctuation $\Delta w$ decreases as the off angle increases. Therefore, as the off angle increases, the surface roughness at the interface between the well layer and the barrier layer decreases.

On the other hand, when the off angle exceeds 26°, the Ga site becomes more dominant than the As site in the main surface of the GaAs substrate. As a result, surface segregation of In substituted for the Ga site becomes significant on the surface of the well layer during growth. When the off angle exceeds 26°, hillock-like surface defects increase. Therefore, when the off angle is 26° or less, the crystallinity of the semiconductor layer formed on the GaAs substrate can be improved.

Although preferred embodiments of the present disclosure have been described in detail above, the present disclosure is not limited to the above embodiments.

The embodiments disclosed herein are to be considered in all respects as illustrative and not restrictive. The scope of the present invention is defined not by the above-described meaning but by the scope of claims, and is intended to include meanings equivalent to the scope of claims and all modifications within the scope.

What is claimed is:

1. A vertical cavity surface-emitting laser configured to emit laser light having a wavelength of 830 nm to 910 nm, the vertical cavity surface-emitting laser comprising:
   a substrate having a main surface including GaAs;
   a first distributed Bragg reflector;
   an active layer; and
   a second distributed Bragg reflector,
   wherein the substrate, the first distributed Bragg reflector, the active layer, and the second distributed Bragg reflector are arranged in a first axis direction intersecting the main surface,
   the main surface has an off angle of 6° or more with respect to a (100) plane crystallographic plane of the GaAs substrate,
   the active layer includes $In_xAl_yGa_{1-x-y}As$ ($0<x<1$, $0\leq y<1$),
   the active layer has a strain, and
   an absolute value of the strain is 0.5% to 1.4%.

2. The vertical cavity surface-emitting laser according to claim 1, further comprising a current confinement layer disposed between the active layer and the second distributed Bragg reflector,
   wherein the current confinement layer includes an aperture portion and an oxidized portion surrounding the aperture portion, and
   the current confinement layer has a uniaxially symmetric shape or an asymmetric shape at a cross section orthogonal to the first axis direction.

3. The vertical cavity surface-emitting laser according to claim 1, wherein the active layer has a carbon concentration of $3\times10^{16}$ $cm^{-3}$ or less.

4. The vertical cavity surface-emitting laser according to claim 1, wherein the absolute value of the strain is 1.1% to 1.3%.

5. The vertical cavity surface-emitting laser according to claim 1, wherein the off angle is 26° or less.

6. The vertical cavity surface-emitting laser according to claim 1, wherein the off angle is 10° or more.

7. The vertical cavity surface-emitting laser according to claim 1, wherein the off angle is 15° or more.

8. The vertical cavity surface-emitting laser according to claim 2, wherein the aperture portion has an asymmetric shape at the cross section.

9. The vertical cavity surface-emitting laser according to claim 2, wherein the aperture portion has an area of 7 $\mu m^2$ to 100 $\mu m^2$ at the cross section.

* * * * *